March 1, 1949.   R. H. DEITRICKSON   2,463,157
REMOVAL OF CASINGS FROM MEAT PRODUCTS
Filed Jan. 31, 1945   10 Sheets-Sheet 3
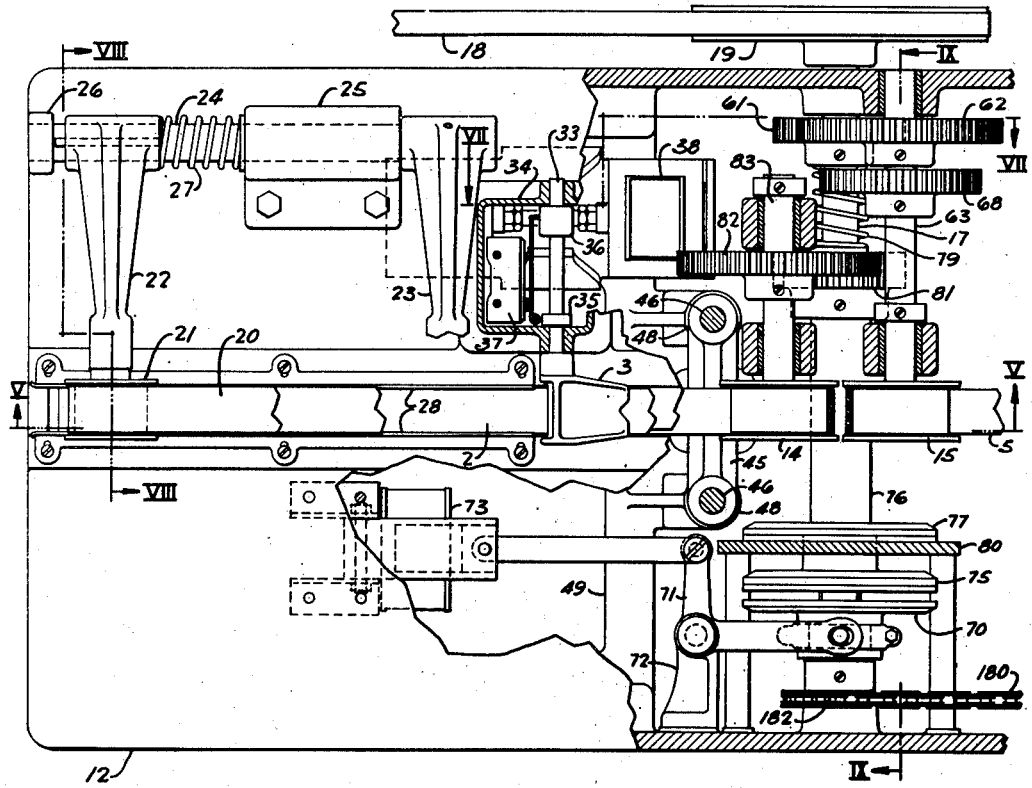
Fig. IV
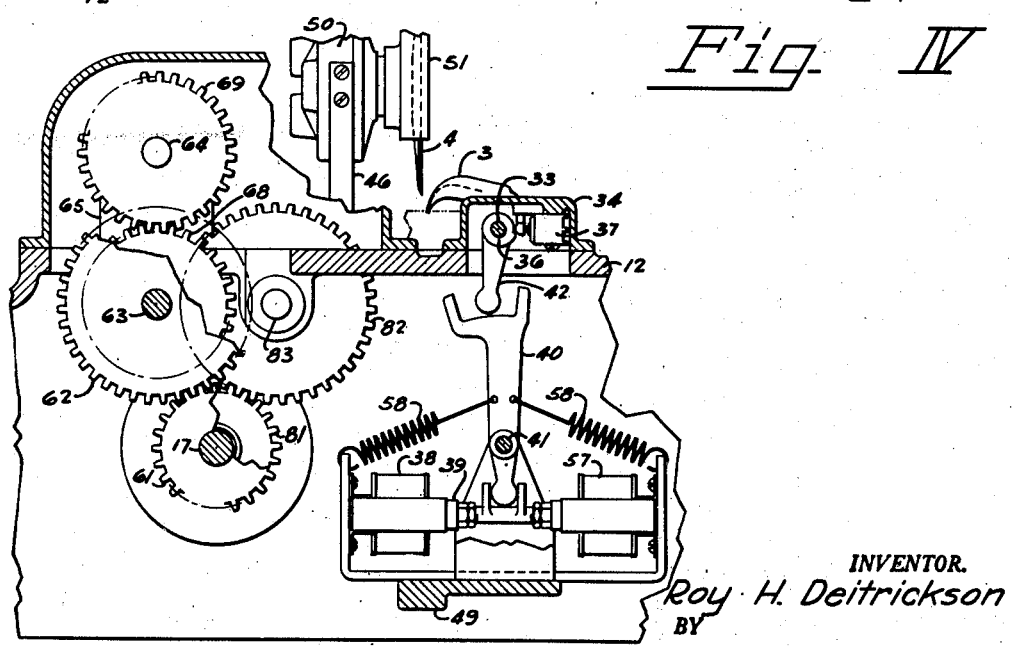
Fig. VII
INVENTOR.
Roy H. Deitrickson
BY
Marshall & Marshall
ATTORNEYS March 1, 1949.  R. H. DEITRICKSON  2,463,157
REMOVAL OF CASINGS FROM MEAT PRODUCTS
Filed Jan. 31, 1945  10 Sheets-Sheet 4
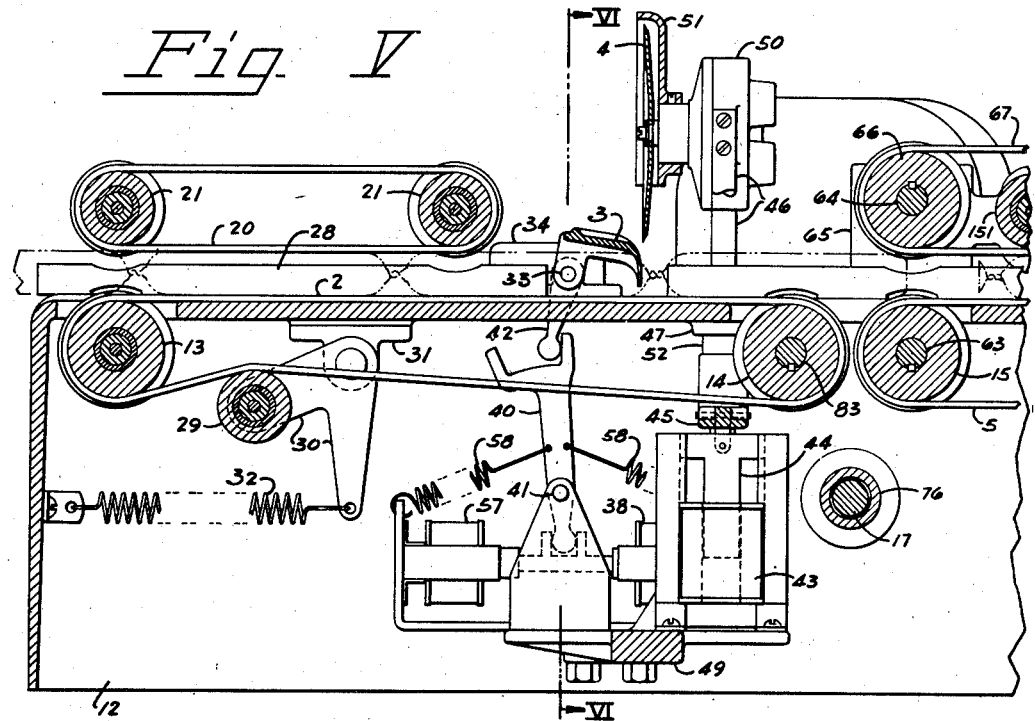
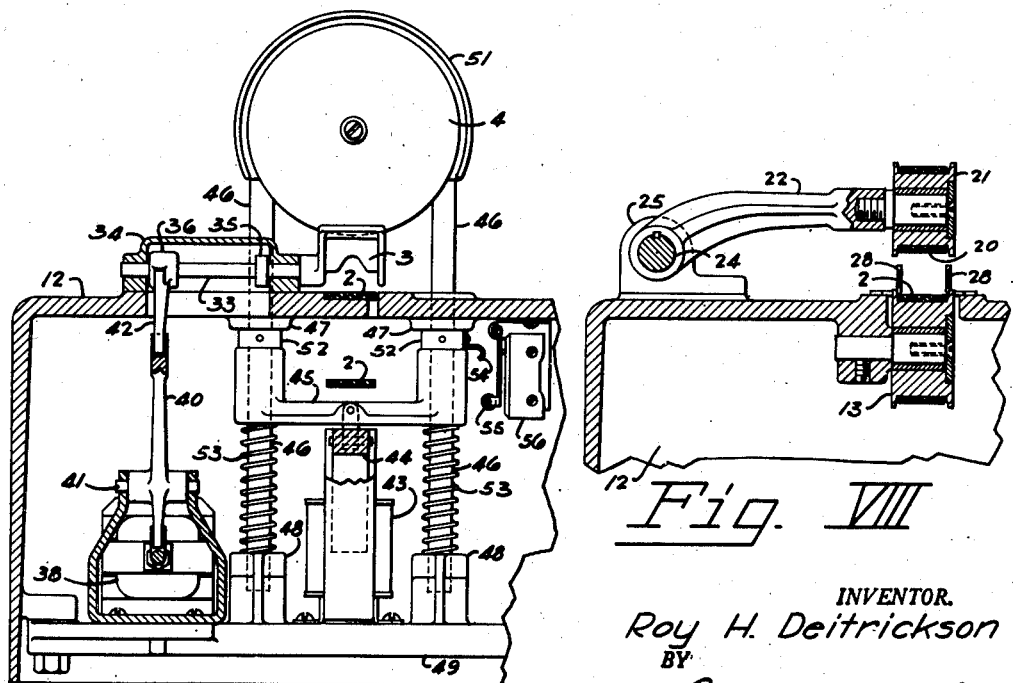
INVENTOR.
Roy H. Deitrickson
BY
Marshall & Marshall
ATTORNEYS March 1, 1949. R. H. DEITRICKSON 2,463,157
REMOVAL OF CASINGS FROM MEAT PRODUCTS
Filed Jan. 31, 1945 10 Sheets-Sheet 5
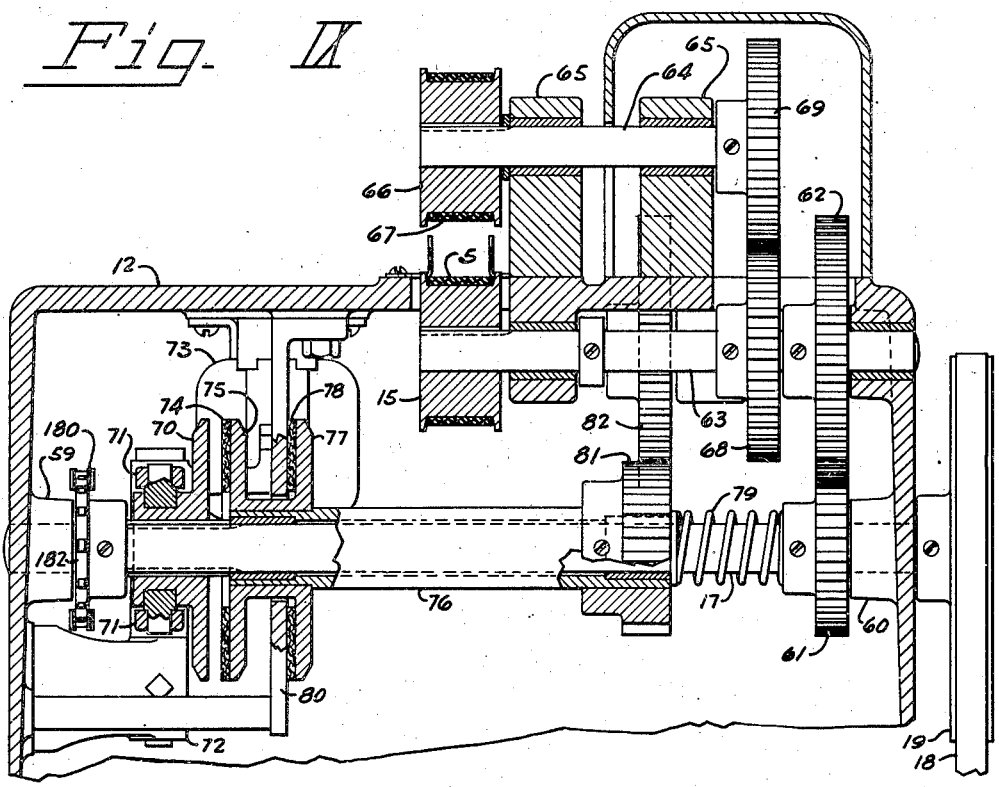
Fig. IX
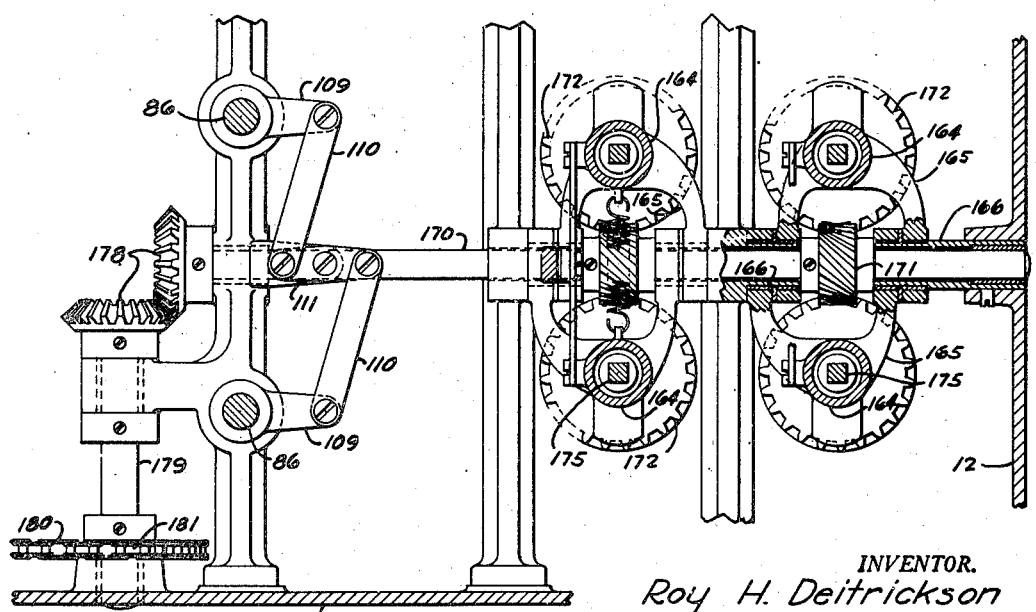
Fig. X
INVENTOR.
Roy H. Deitrickson
BY
Marshall & Marshall
ATTORNEYS

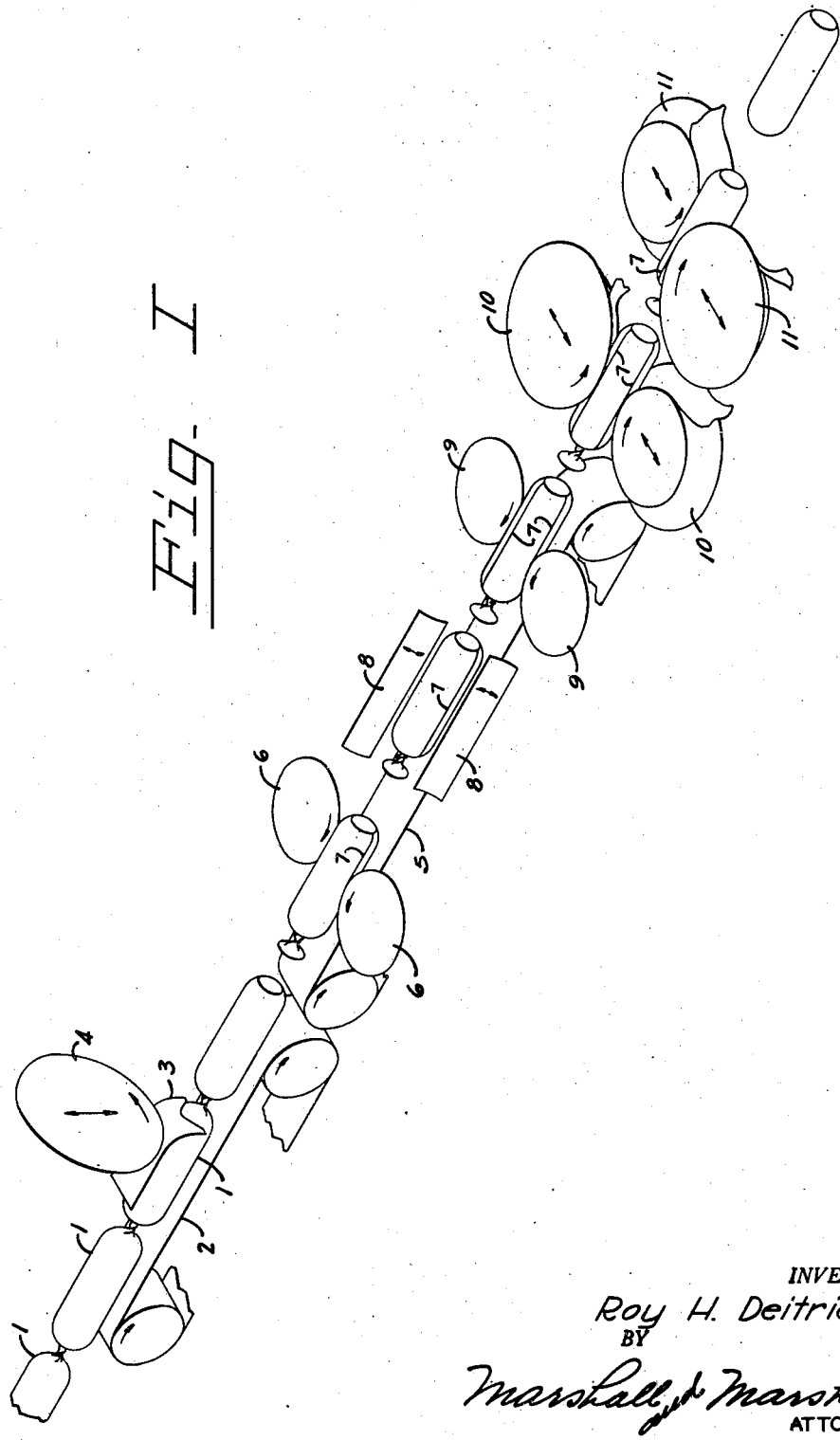

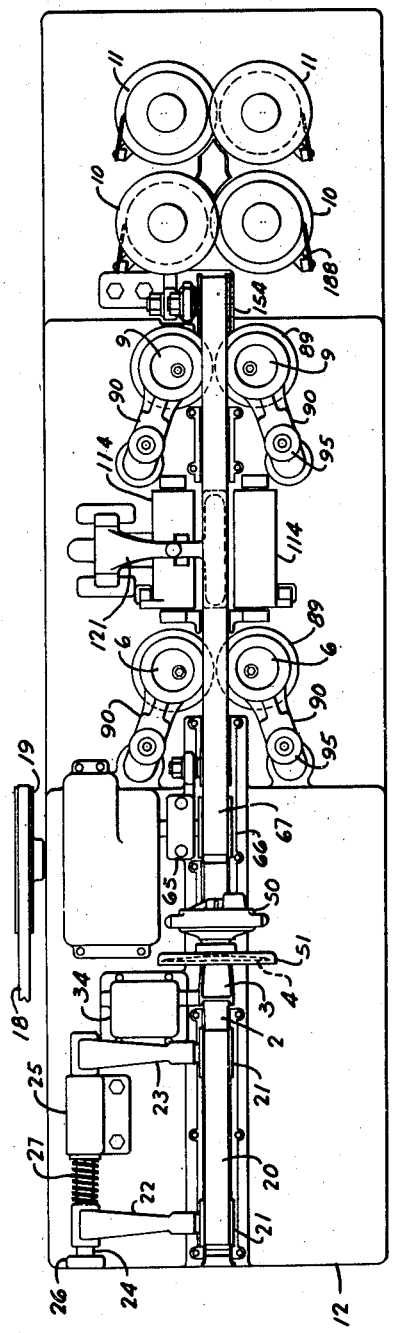

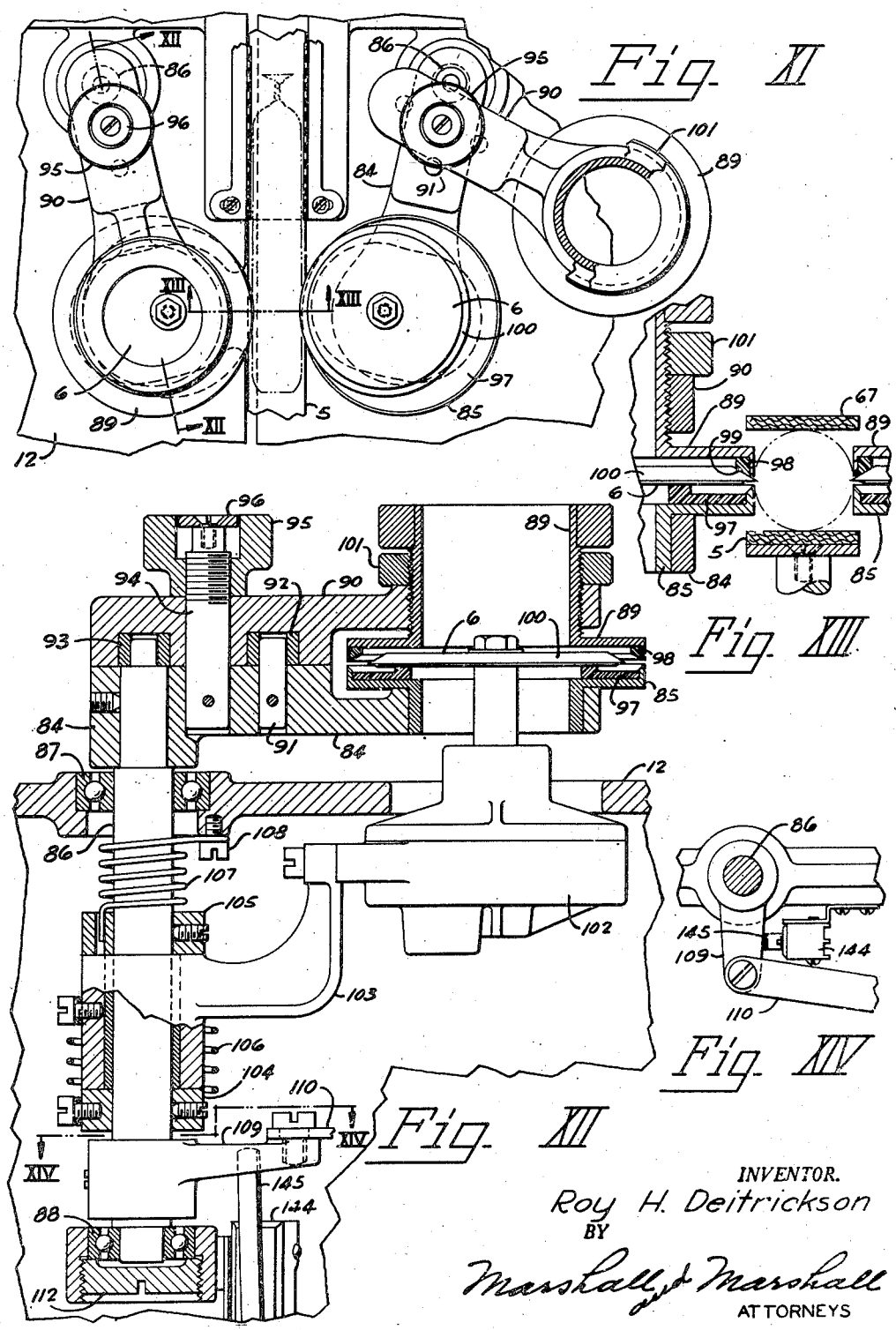

March 1, 1949.  R. H. DEITRICKSON  2,463,157
REMOVAL OF CASINGS FROM MEAT PRODUCTS
Filed Jan. 31, 1945  10 Sheets-Sheet 7
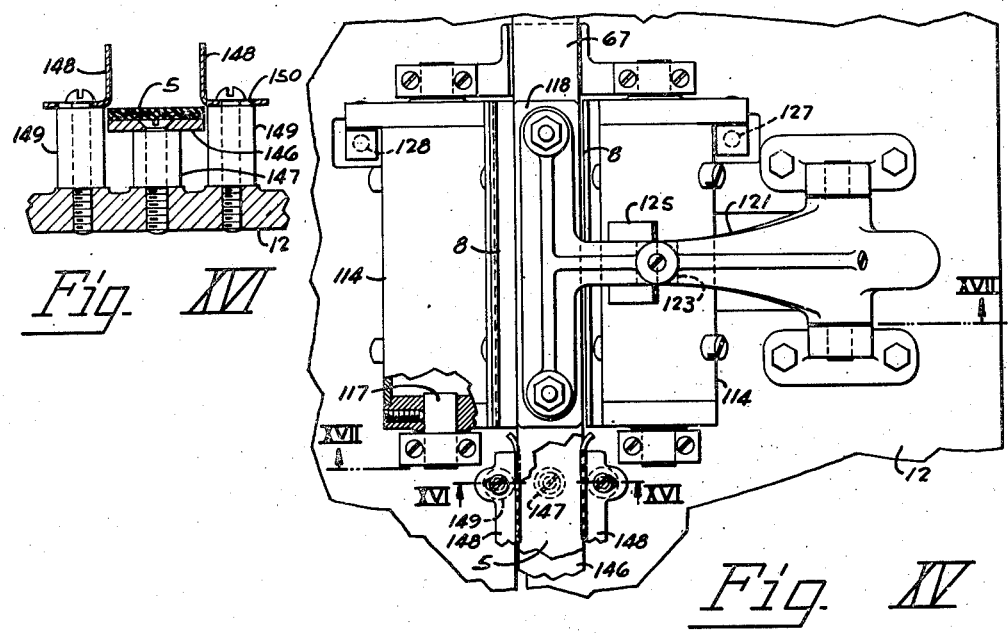
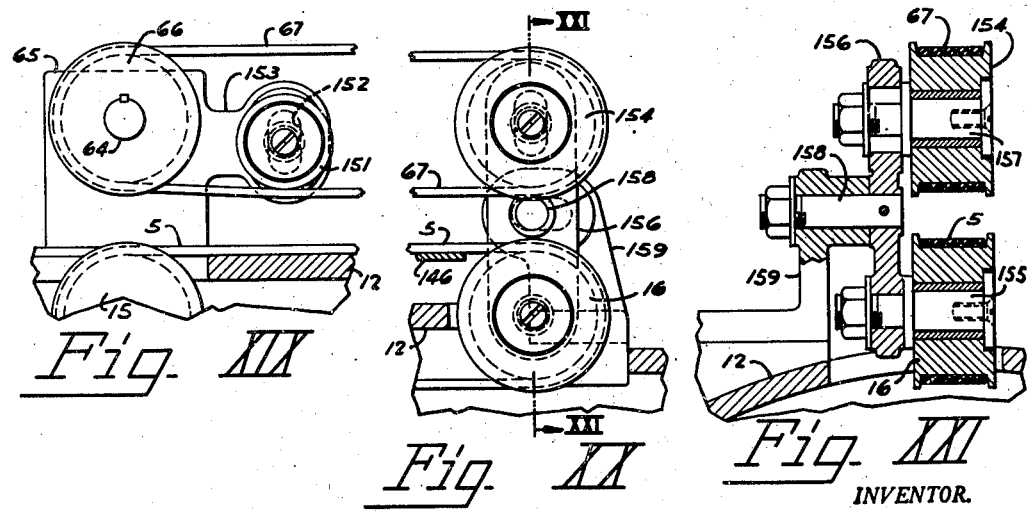
INVENTOR.
Roy H. Deitrickson
BY
Marshall and Marshall
ATTORNEYS March 1, 1949.  R. H. DEITRICKSON  2,463,157
REMOVAL OF CASINGS FROM MEAT PRODUCTS
Filed Jan. 31, 1945  10 Sheets-Sheet 8
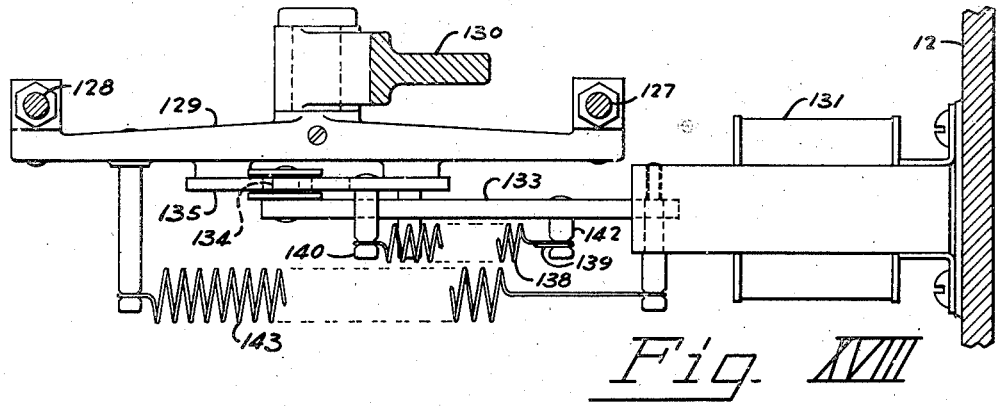
Fig. XVIII
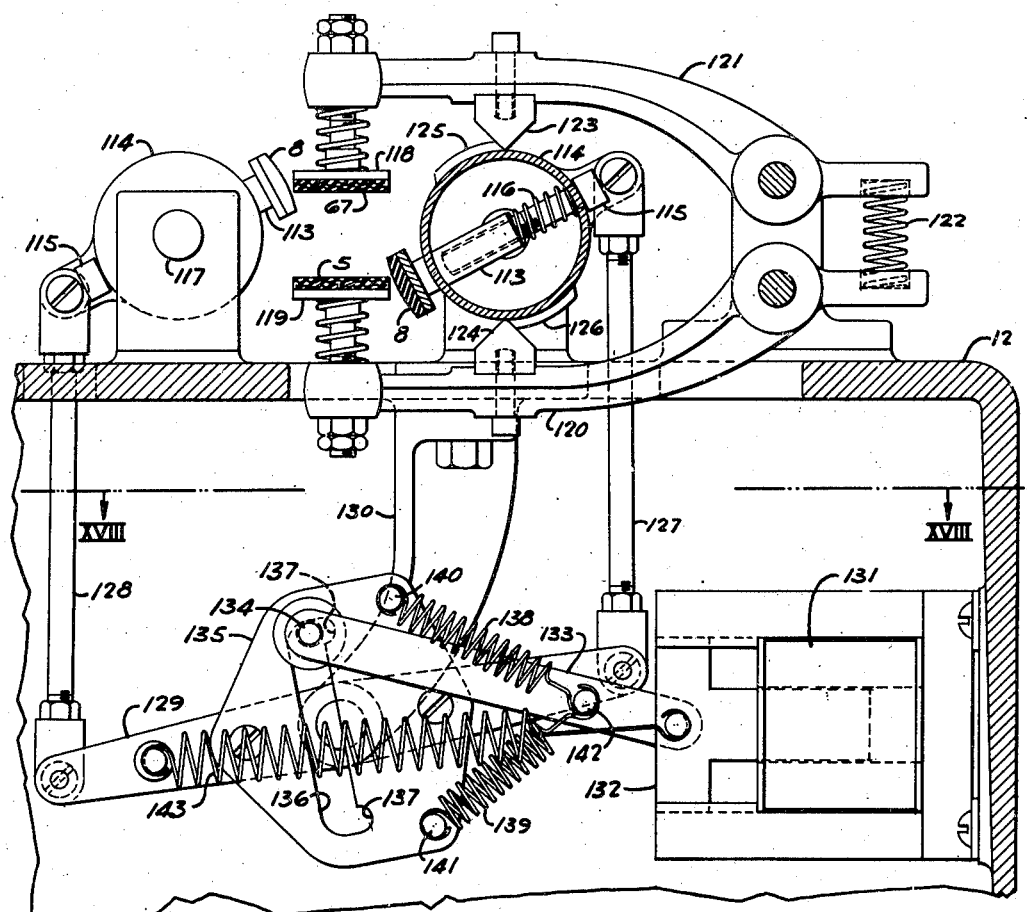
Fig. XVII
INVENTOR.
Roy H. Deitrickson
BY
Marshall & Marshall
ATTORNEYS March 1, 1949.  R. H. DEITRICKSON  2,463,157
REMOVAL OF CASINGS FROM MEAT PRODUCTS
Filed Jan. 31, 1945  10 Sheets-Sheet 9
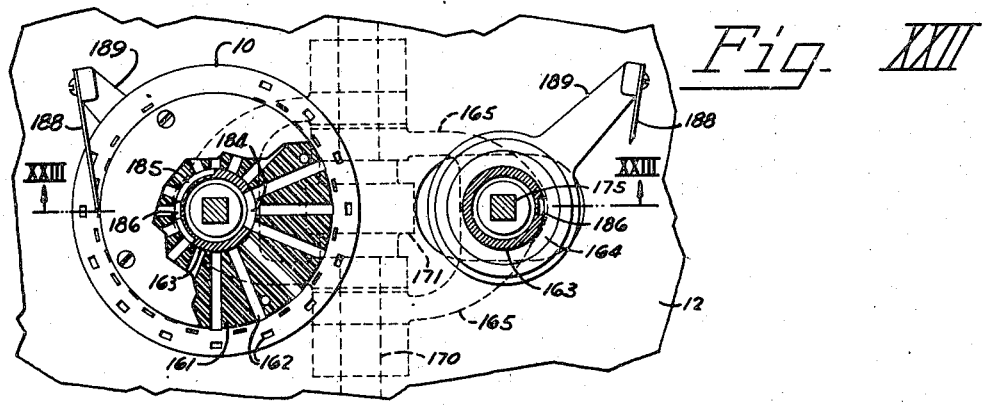
Fig. XXII
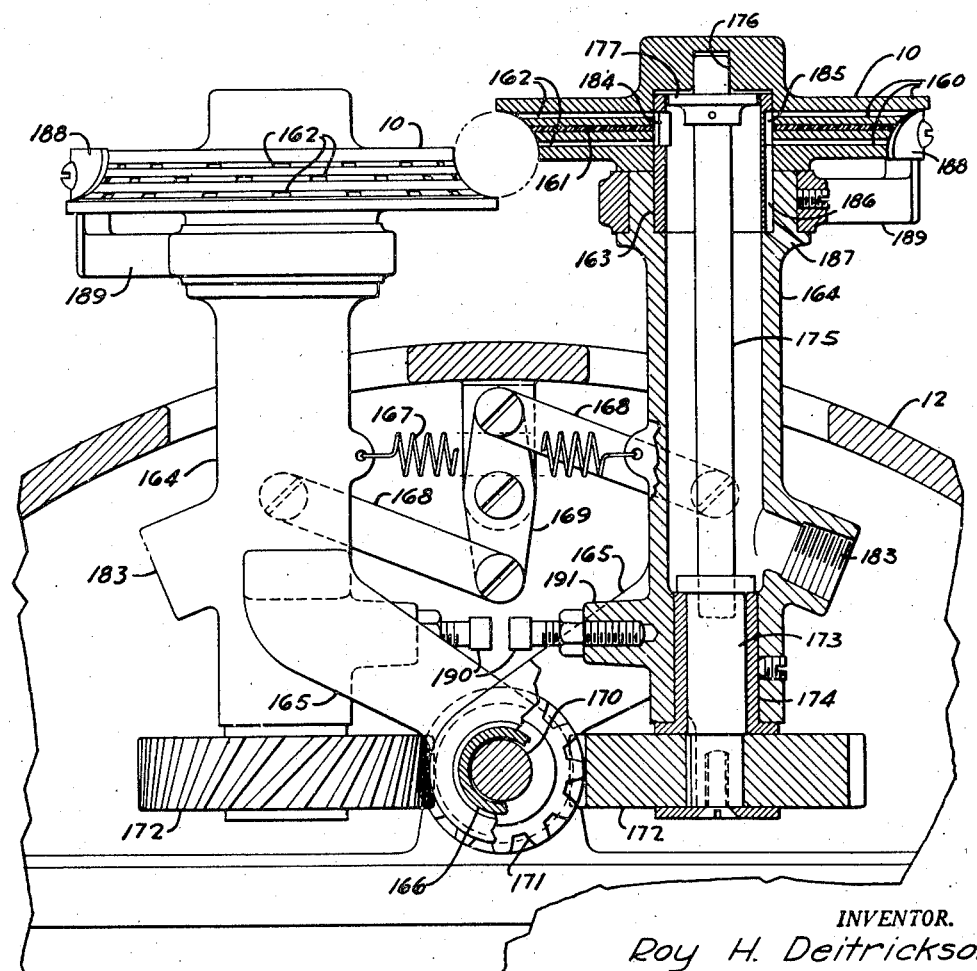
Fig. XXIII
INVENTOR.
Roy H. Deitrickson
BY
Marshall & Marshall
ATTORNEYS

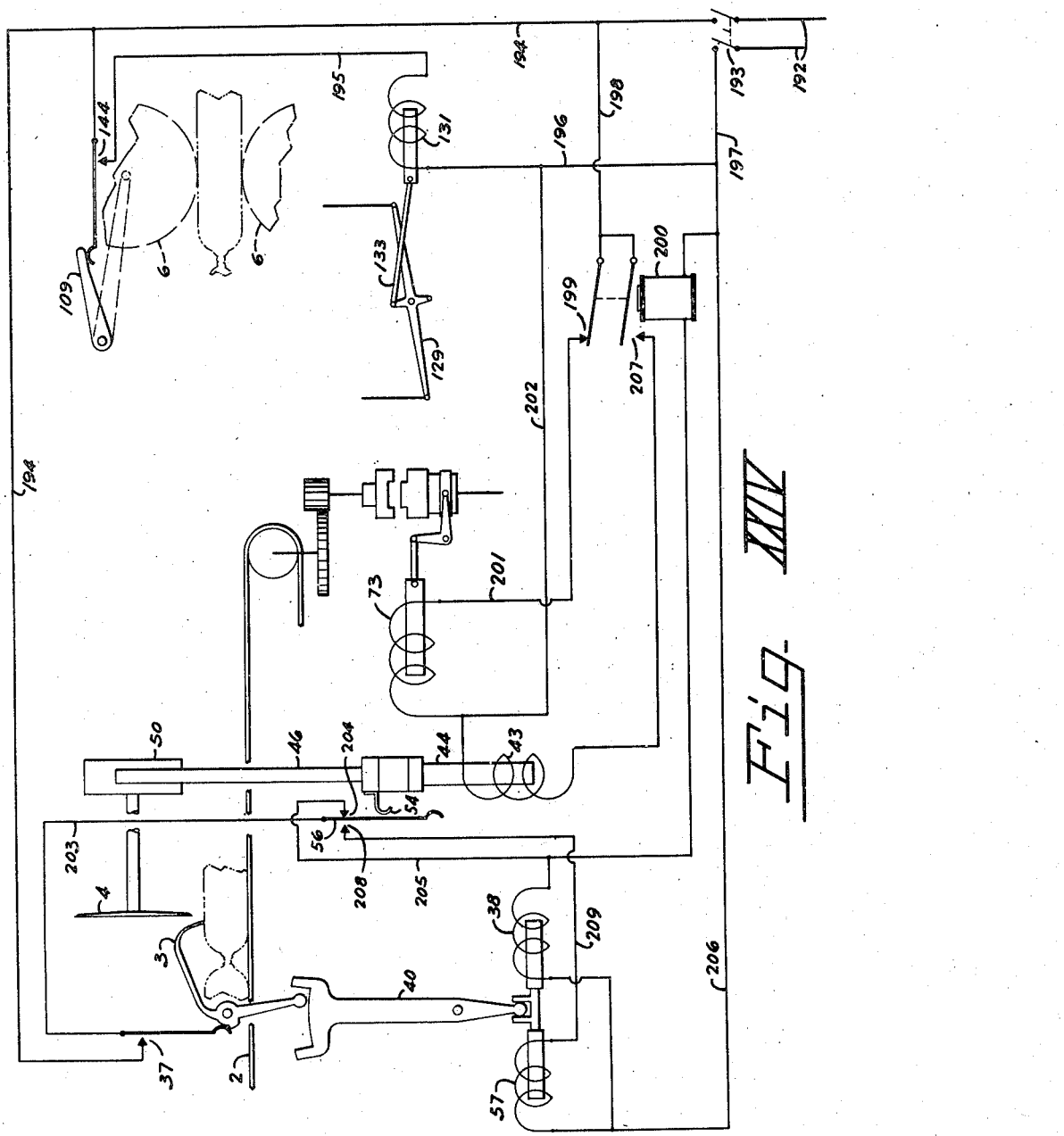

Patented Mar. 1, 1949

2,463,157

UNITED STATES PATENT OFFICE 2,463,157

REMOVAL OF CASINGS FROM MEAT PRODUCTS

Roy H. Deitrickson, Toledo, Ohio, assignor of one-half to J. McLeod Little, Toledo, Ohio Application January 31, 1945, Serial No. 575,484

15 Claims. (Cl. 17—1)

This invention relates to meat packing equipment and in particular to a method and machine for removing the cellophane casings used in the manufacture of wieners and similar products.

Numerous attempts have been made to devise a method adaptable to machine operation which would allow satisfactory removal of the cellophane casing without weakening or disintegrating the material of the wiener itself. It has been proposed to inject air or other gas under pressure into the wiener to blow the casing off but this process tends to disintegrate the wiener itself. Other methods have also been tried but have not proven satisfactory. As a result the meat packers have resorted to hand stripping, usually employing girls to do the work. Hand stripping is a slow laborious operation, the average output of each operator being approximately twelve pounds per hour.

The principal object of this invention is to develop a method of removing cellophane casings or casings of other material from wieners and like products without otherwise damaging the product.

Another object is to provide a method of removing cellophane casings or casings of other material from wieners and like products without otherwise damaging the product, which is susceptible to machine operation.

Another object is to provide a guarded knife assembly which by cutting part way through a cellophane casing materially facilitates the removal of the casing.

A still further object of the invention is to provide suction rolls for applying vacuum to the outside of a casing to strip it from a wiener or other product.

One characteristic of cellophane is its unusual strength until it is scratched or nicked and its low resistance to tearing once a tear is started. This characteristic of cellophane and the inevitable presence of grease on the casings are the chief reasons for the failure of prior stripping machines.

According to the present invention these obstacles may be overcome by first scoring the cellophane to produce a weakened or potential tearing line and subsequently applying a vacuum or suction to the cellophane casing adjacent the potential tearing line to tear the cellophane along the line and to strip it from the wiener. In an actual machine employing the method of the invention a chain of wieners are fed in at one end of the machine, a cut-off knife separates them, a plurality of rotary scoring knives produce longitudinal cuts in the casing and, finally, a set of suction rolls, by applying suction to the areas between the cuts, strips the casing from the wieners. The scoring knives are constructed with guards so that they may be adjusted to cut nearly, but not entirely, through the cellophane thus weakening the cellophane without marking the wiener. After the scoring, suction is applied to the outside surface of the cellophane thus removing it without otherwise affecting the wiener.

The method of skinning the wieners and a machine for performing the operations are illustrated in the accompanying drawings.

In the drawings:

Figure I is an elementary schematic diagram illustrating the various steps in the skinning operation.

Figure II is a front elevation of the complete machine.

Figure III is a plan view of the machine.

Figure IV is a plan view, with parts broken away, as seen from the line IV—IV of Figure II, showing the incoming feeder and some of the mechanism for separating the wieners from the chain of wieners.

Figure V is a vertical section taken along the line V—V of Figure IV showing the incoming feeder and the cut-off knife.

Figure VI is a vertical section taken along the line VI—VI of Figure V.

Figure VII is a vertical fragmentary section taken along the line VII—VII of Figure IV.

Figure VIII is a vertical section taken along the line VIII—VIII of Figure IV.

Figure IX is a vertical section taken substantially along the line IX—IX of Figure IV.

Figure X is a fragmentary plan view, partly in section, of the driving mechanism for the suction rolls.

Figure XI is a fragmentary plan view of the scoring knives.

Figure XII is a vertical section showing the mounting and controlling mechanism of one of the scoring knives as seen from the line XII—XII of Figure XI.

Figure XIII is a fragmentary section taken along the line XIII—XIII of Figure XI.

Figure XIV is a fragmentary vertical view of the switch operating mechanism taken substantially along the line XIV—XIV of Figure XII.

Figure XV is a plan view, partly in section, of the mechanism used to rotate the wieners so as to space the scoring cuts uniformly about its periphery.

Figure XVI is a fragmentary section taken along the line XVI—XVI of Figure XV.

Figure XVII is a fragmentary vertical section, as seen from the line XVII—XVII of Figure XV, showing the operating mechanism for rotating the wieners.

Figure XVIII is a fragmentary plan view of the wiener rotating mechanism as seen from the line XVIII—XVIII of Figure XVII.

Figure XIX is a fragmentary detail showing the adjustment of the incoming end of the second conveyor.

Figure XX is a fragmentary detail of the discharge end of the second conveyor.

Figure XXI is a fragmentary vertical section taken substantially along the line XXI—XXI of Figure XX.

Figure XXII is a fragmentary plan view with parts broken away to show some of the details of the suction stripping rolls.

Figure XXIII is a vertical elevation, partly in section, taken substantially along the line XXIII—XXIII of Figure XXII.

Figure XXIV is a schematic wiring diagram for the electrical control of the skinning mechanism.

These specific figures and the accompanying description are intended merely to illustrate the principle of the invention and a mechanism whereby it may be utilized.

The new process of removing the casing from a wiener is schematically illustrated in Figure I. A chain of wieners is fed into the machine on a conveyor 2. A pivoted catch or fork 3 carried on a horizontal axis is designed to ride along on the top of a wiener and to drop into the space between the individual wieners of the chain. When it drops into such a space it energizes a solenoid which allows a rotating cut-off knife 4 to move downwardly to cut the end of the wiener protruding between the tines of the fork 3 much as one would trim the end of a cigar. The conveyor 2 is stopped each time the fork 3 and the knife 4 operate so as not to jam the oncoming wieners. A second conveyor 5, which operates continuously, takes the wieners as they are separated by the cut-off knife 4 and passes them between scoring knives 6. The scoring knives 6 are fitted with guards, not shown in Figure I, which allow the knives to cut nearly but not entirely through the cellophane casing of the wieners thus producing potential tearing lines 7 along their sides. After the wiener passes the scoring knives 6 it enters the space between a pair of turning pads 8 which rotate the wiener 90° about its longitudinal axis. It then passes between a second pair of scoring knives 9 which produce another set of potential tearing lines spaced from those produced by the first set of scoring knives 6. After leaving the second set of scoring knives 9 the wiener is passed between two pairs of suction rolls 10 and 11. The suction rolls, by applying vacuum to the cellophane casing, tear the casing along the potential tearing lines 7 and strip it from the wiener.

The cut produced by the cut-off knife 4 is of sufficient diameter with respect to the roundness of the end of the wiener so that the suction rolls 10 and 11, which are mounted for horizontal movement perpendicular to the travel of the wiener, may grasp the end of the cellophane casing to be sure to get all of the cellophane and not have to tear it free starting at a point away from the end. The tied portion and the tip of the succeeding wiener is stripped off with the preceding casing as it is removed by the suction rolls.

The complete machine for performing these functions is shown in Figures II and III.

It comprises a cast base 12 on which all the mechanism is mounted. The feeding conveyor 2 is mounted on pulleys 13 and 14 while the conveyor 5 runs on pulleys 15 and 16. The conveyor pulleys 14 and 15 are driven through gearing from a shaft 17 which in turn is belt driven from a motor or other power source by a belt 18 running over a pulley 19 secured to the shaft 17. To prevent the wieners from slipping on the conveyor 2 an auxiliary belt 20 is provided. The belt 20 is carried on a pair of pulleys 21 journaled on the ends of arms 22 and 23 which extend laterally from a shaft 24 journaled in bushings 25 and 26 secured to the base 12. The arm 22 is keyed to the shaft 24 so as to be slidable therealong while it is maintained in alignment with the arm 23. A compression spring 27 circumjacently mounted on the shaft 24 between the bushing 25 and the arm 22 tends to separate the arms 22 and 23 and thus maintains tension on the belt 20. Journaling the shaft 24 allows vertical movement of the auxiliary conveyor 20 to accommodate various sizes of wieners. A pair of guides 28 are provided to prevent the wieners from escaping laterally from between the conveyor 2 and cooperating belt 20. The arrangement of these parts is clearly shown in Figure VIII. The lower conveyor 2 is kept tight by an idler pulley 29 journaled on one end of a bell crank 30 which is pivotally mounted in a bracket 31 depending from the under side of the top of the base 12. A tension spring 32 is hooked onto the other end of the bell crank 30 to provide the required tension for the conveyor 2.

The fork 3, which catches the wieners just ahead of the cut-off knife 4, is secured to the end of a shaft 33 journaled in a small housing 34 erected on the upper surface of the base 12 at one side of the conveyor 2. The shaft 33 is held against endwise motion by collars 35 and 36, the latter having a cam surface adapted to actuate a microswitch 37 mounted within the housing 34. When the fork 3 drops into the space between two wieners the cam surface of the collar 36 actuates the microswitch 37 to energize a solenoid 38 which, by attracting its armature 39, rotates a forked lever 40 about its axle 41. The forked upper end of the lever 40 engages an arm 42 extending downwardly from the collar 36 which moves with the fork 3. The movement of the forked lever 40 locks the fork 3 in wiener-holding position so that the over run of the conveyor 2 may force the approaching wiener firmly against the work 3 so that its end will protrude in position to be cut by the knife 4.

Simultaneously with the locking of the fork 3 current is supplied to a knife solenoid 43 which acting through its armature 44 pulls a yoke 45 downward. The yoke 45 is slidably mounted on a pair of vertical rods 46 which are themselves slidably mounted through bosses 47 formed under the top of the cast base 12 and steps 48 erected from a bridge 49 spanning the bottom of the base 12. The upper ends of the rods 46 support motor 50 which drives the cut-off knife 4. A guard 51 attached to the housing of the motor 50 protects the upper periphery of the knife 4. The rods 46 are positioned vertically by pinned collars 52 located between the yoke 45 and the bosses 47. A pair of compression springs 53 surrounding each of the rods 46 in the space between the steps 48 and the yoke 45 ordinarily act through the yoke 45 and the collars 52 to hold the knife 4 in its upper position clear of the wieners carried on the conveyor 2. When the solenoid 43 is energized it pulls the yoke 45 down thus compressing the springs 46 and allowing the knife 4 to drop under the force of gravity. The stroke of the armature 44 of the solenoid 43 is of such length that the collars 52 strike the top of the yoke 45 as the knife 4 completes its cut through the end of a wiener. Sufficient slack is allowed in the connection between the armature 44 and the yoke 45 so that the springs 53 can cushion and stop the drop of the knife 4 before it can strike the conveyor 2.

The motor 50 while it may be of any suitable type, is shown as a hydraulic motor of the type described and claimed in application for United States Letters Patent Ser. No. 558,647.

When the knife 4 has dropped to the bottom of its stroke a finger 54 attached to one of the collars 52 contacts a roller actuator 55 of a microswitch 56. This microswitch cuts off power to the solenoid 43 to allow the springs 53 to return the motor 50 and knife 4 to their upper positions and, at the same time, energizes a solenoid 57 which thereupon acts to swing the forked lever 40 to its opposite extreme position. The swing of the forked lever 40 disengages the fork 3 from the wiener which it is holding and by restoring the fork 3 to its upper position opens the microswitch 37 which, being in series with the microswitch 56, deenergizes the solenoid 57. Thereupon, a pair of springs 58 act to restore the forked lever 40 to its neutral position in anticipation of another cycle.

The drive for the conveyors, as was mentioned previously, is taken from a source of power through the belt 18 and pulley 19 mounted on the shaft 17. The shaft 17 extends transversely of the base 12 (see Figures IV and IX) and is journaled in bosses 59 and 60 cast integrally with the side walls of the base 12. The shaft 17 adjacent the boss 60 is provided with a gear 61 which meshes with a gear 62 secured to a parallel shaft 63 journaled just below the upper surface of the base 12. The pulley 15 driving the second conveyor 5 is carried on the shaft 63. Another shaft 64 journaled in stands 65 erected above the base 12 is provided with a pulley 66 driving an upper conveyor belt 67 which cooperates with the conveyor 5 in feeding the wieners past the scoring knives 6 and 9. The shaft 64 is driven from the shaft 63 by a pair of gears 68 and 69. The conveyor 5 and the upper cooperating conveyor belt 67 are thus driven continuously and at the same speed directly from the power source.

Near its other end the shaft 17 is splined to receive and drive a clutch 70. The clutch 70 is actuated by a bell crank 71 pivotally mounted in a bracket 72, the bell crank being powered by a clutch solenoid 73. When the solenoid 73 is energized it pulls the clutch member 70 into driving relationship with friction material 74 secured to the adjacent flange of a spool 75. The spool 75 is secured to one end of a sleeve 76 which is journaled on the shaft 17 for both rotary and axial motion. The other flange 77 of the spool 75 is lined with brake material 78 so that when the solenoid 73 is de-energized to release the clutch a compression spring 79 circumjacently mounted on the shaft 17 between the gear 61 and the end of the sleeve 76 may push the sleeve and the brake material 78 into contact with a fixed brake plate 80 to immediately stop the rotation of the sleeve 76. The pulley 14 driving the conveyor 2 is driven from the sleeve 76 through another gear 81, similar to the gear 61, meshing with a gear 82 mounted with the pulley 14 on a short shaft 83.

The electrical control for the clutch solenoid 73 is interlocked with the control for the knife solenoid 43 so that the conveyor 2 is stopped during the time that the knife 4 is severing one wiener from the next. After the wieners have been separated from each other by the cut-off knife 4 they are picked up by the continuously operated conveyor 5 and carried between the scoring knives 6. These knives 6 are shown in detail in Figures XI, XII and XIII. Each of the scoring knives is carried in its own housing which comprises a lower member 84 whose distal end is a horizontally disposed ring adapted to receive a circular lower knife guard 85 and whose other end, in a shape of an arm, is mounted on a vertical shaft 86 which is journaled in ball bearings 87 and 88 mounted in the base 12. An upper knife guard 89 which cooperates with the lower knife guard 85 in determining the depth of cut is adjustably mounted in an upper housing member 90. The member 90 is accurately maintained in position relative to the lower member 84 by a dowel pin 91 and the small diameter upper end of the vertical shaft 86. Hardened bushings 92 and 93 set into the upper housing member 90 prevent any wear which might allow the upper housing member 90 to be displaced from its true position. A stud 94 set into the lower housing member 84 midway between the shaft 86 and the dowel pin 91 extends upwardly through a hole in the upper housing member 90 and carries a thumb nut 95 screwed onto its upper end. The thumb nut 95 serves to clamp the housing members tightly together and when it is sufficiently released it allows the upper member 90 to be raised off the dowel pin 91 and the shaft 86 and rotated about the stud 94 to give access to the scoring knife 6. To prevent complete disassembly the upper surface of the thumb nut 95 is counterbored to a diameter slightly larger than the thread and a washer 96 of substantially the same diameter is secured to the upper end of the stud 94 with its upper surface substantially flush with the upper surface of the thumb nut 95 when the housing members 90 and 84 are clamped together.

The knife guards 85 and 89 are fitted with bearing rings 97 and 98 made of Bakelite or other suitable material. The lower bearing ring 97 contacts the smooth lower surface of the knife 6. The upper bearing ring 98 is provided with a beveled lower surface 99 which runs on the upper beveled edge 100 of the knife 6. The upper knife guard 89 is threaded into the upper housing member 90 so that it may be adjusted vertically and when adjusted may be secured in position by a locking ring 101. The knife 6 is mounted separately from the guards 85 and 89 and is resiliently held eccentric thereto. This construction is used so that by adjusting the upper knife guard 89 in the upper housing 90 so as to change the clearance between the bearing rings 97 and 98 the protrusion of the knife and hence the depth of cut may be controlled. The lower surface of the cutting edge of the knife 6 is hollow ground on a coarse wheel so as to produce a slightly burred cutting edge somewhat in the nature of a fine tooth saw. The beveled edge 100 of the knife 6 is ground smooth to prevent wearing or scraping the bearing ring 98. Thus a structure is obtained which, without sacrificing the advantages of a finely serrated cutting edge, does not wear or cut the bearing rings 97 or 98.

The knife 6 may be preferably driven by a small hydraulic motor 102 which is mounted on an arm 103 whose supporting end is journaled on the vertical shaft 86. The arm 103 is positioned along the shaft 86 by a pair of collars 104 and 105. A coil spring 106 is connected to the arm 103 and the collar 104 and tends to rotate the arm 103 and the motor 102 with respect to the shaft 86 and the knife guard housings 84 and 90 so as to maintain the knife 6 in correct position with respect to the knife guards 85 and 89. Another coil spring 107 surrounding the shaft 86 is connected between a screw 108 tapped into the base 12 and the upper collar 105 and is tensioned to rotate the entire assembly of knife and guard into contact with a wiener carried on the conveyor 5. The lower end of each shaft 86 is provided with an arm 109 which being connected through a linkage 110 and a reversing lever 111 to a similar arm and linkage of the cooperating knife assembly, ensures that as the assembly swings on the shaft 86 to accommodate the wieners fed through between the knives, the knife assemblies are constrained to move equal distances and to maintain their distances from the center line of the conveyor 5 equal at all times. The reversing linkage for the first pair of scoring knives 6 is not shown but is the same as that employed for the second pair of knives 9 which is shown in Figure X.

In order to secure successful operation of the suction rolls it is desirable that the scoring cuts produced by the knives 6 or 9 be on the horizontal center line of the wiener. Therefore, a limited amount of vertical adjustment of the knives is provided by supporting the lower ball bearing 88, which journals the vertical shaft 86, on a threaded plug 112 so that its height with respect to the base 12 may be adjusted. The shaft 86 slides through the upper ball bearing 87 so that further adjustment is not required at that point.

Because the second set of scoring knives 9 are operated in the same plane as the first set of knives 6, it is necessary to rotate the wiener approximately 90° after it has passed the first pair of scoring knives 6 and before it reaches the second set 9. The mechanism for rotating the wieners is shown in Figures XV, XVII, and XVIII. Referring primarily to Figure XVII this structure comprises a pair of turning pads 8, as shown schematically in Figure 1. These turning pads or surfaces 8 are made of resilient material and are carried on the ends of elongated internally threaded sleeves 113 which extend transversely into hollow cylinders 114 which are mounted parallel to and in the same horizontal plane as a wiener carried between the conveyor 5 and the cooperating conveyor belt 67. The sleeves 113 carrying the pads 8 are held in position by bolts 115 entering the cylinders 114 diametrically opposite the sleeves 113 and threaded into the sleeves 113. Compressed coil springs 116 circumjacently mounted on the bolts 115 between the ends of the sleeves 113 and the opposite inner wall of the cylinder 114 urge the pads 8 into position to contact a wiener but yet allow the pads to give or move away in case they encounter undue resistance. The cylinders 114 are mounted for rotation about their longitudinal axes on trunnions 117.

The conveyor belt 67 is normally adjusted so as to bear firmly on the upper surface of the wiener and to hold it in contact with the conveyor 5. Obviously the pads 8 could not rotate the wiener while it is so held. Therefore adjacent the pads 8 the conveyor 5 and the conveyor belt 67 are supported on resiliently mounted surfaces 119 and 118 carried on the ends of pivoted arms 120 and 121. A compression spring 122 acting between backwardly extending portions of the arms 120 and 121 causes the arms to press the conveyors into contact with the wieners. The amount of travel in response to the action of the spring 122 is limited by cam followers 123 and 124 which ride on the outer surface of one of the cylinders 114 and camming surfaces 125 and 126 attached thereto.

The cylinders 114 are interconnected by a linkage comprising vertical links 127 and 128 and a walking beam 129. The walking beam 129 is pivotally mounted at the lower end of a bracket 130 depending from the upper inner surface of the base 12.

The walking beam 129 and the cylinders 114 connected thereto are operated by a solenoid 131 whose armature 132 is connected through a link 133 and pin 134 to a plate 135 carried on the walking beam 129. The pin 134 which is riveted into the link 133 slides in a slot 136 cut in the plate 135. Each end of the slot 136 is provided with a notch 137 to receive the pin 134 when the solenoid is operated. A pair of springs 138 and 139 are connected between pins 140 and 141 on the plate 135 and a pin 142 on the link 133. The geometry of these parts and the lengths of the springs 138 and 139 are such that the link 133 and its pin 134 are positioned to reverse the position of the walking beam 129 each time the solenoid 131 is energized. In the position shown in Figure XVII the spring 138 has pulled the link 133 into its upper position. The next time the solenoid 131 is energized the pin 134 will enter the adjacent notch 137 and will rotate the walking beam 129 about its pivot point to its opposite position. Such rotation will release the tension in the spring 138 and will stretch the spring 139. Therefore, when the solenoid 131 is de-energized the link 133 will move to the other end of the slot 136 in preparation for the next stroke. A long spring 143 connected between the armature 132 of the solenoid and the far end of the walking beam 129 serves to restrict the armature 132 and to provide a certain amount of over center effort to hold the walking beam 129 at either extreme of its travel.

While the cylinders 114 are rotating from one position to the other the cam surfaces 125 and 126 separate the arms 120 and 121 to release the pressure with which the conveyor holds the wiener and to allow the pads 8 to rotate it. The over center linkage between the walking beam 129 and the solenoid 131 is required so that the pads 8 do not return the wiener to its original position as soon as the solenoid is de-energized. Inasmuch as it is immaterial in which direction the wiener is rotated the number of operations of the turning mechanism is cut in half by allowing it to rotate one wiener during the forward stroke and another wiener during the reverse stroke. The solenoid 131 is controlled by a microswitch 144 (Figures XII and XIV) actuated by the first set of scoring knives 6 as they oscillate in and out during the passage of a wiener. The arrangement is such that when a wiener is between the knives 6 and they are separated thereby, the arm 109 is pushed away from a spring 145 of the microswitch and the microswitch is opened. As the wiener passes the space between the scoring knives 6 and they swing toward each other under the action of the spring 107 the arm 109 bends the spring 145 to operate the microswitch 144. By this time the wiener is in position between the pads 8 and the solenoid 131 acts to rotate it. As the next wiener comes along and forces the scoring knives 6 apart the microswitch is again opened, the solenoid de-energized and the turning mechanism is brought in readiness for the next cycle.

The wieners are not always of exactly the same diameter and while differences in diameter do not affect the incoming conveyor and the cut-off mechanism those differences will reduce the effectiveness of the remaining structure if provision is not made to adjust for them. For this reason the conveyor 5 is carried on a supporting surface 146 which in turn is supported on easily changed spacers 147 and is therefore readily adjusted with respect to the upper surface of the base 12. Guides 148 positioned along the sides of the conveyor in the spaces between the scoring knives and the cut-off mechanisms are also carried on spacers 149 and in addition have their mounting holes 150 slotted so as to allow lateral adjustment.

The pulleys 15 and 66 are carried on shafts which are geared together. Therefore, their spacing is fixed and incapable of adjustment. To accommodate the various sizes of wieners an idler pulley 151 is provided immediately adjacent the pulley 66, the axle of the idler pulley 151 being vertically adjustable in a slot 152 cut in an arm 153 extending from one of the stands 65. At the other end the conveyor belts are run over pulleys 16 and 154. The pulley 16 carrying the end of the conveyor 5 is journaled on a stud 155 extending laterally from the bottom end of a double tree lever 156 while the pulley 154 carrying the end of the conveyor belt 67 is journaled on a stud 157 mounted in the other end of the lever 156. The hole in the lever 156 to accommodate the stud 157 is elongated to provide vertical adjustment of the stud 157 and therefore the spacing between the conveyor 5 and the conveyor belt 67. The lever 156 is carried at its center on a rod 158 which extends through a slotted hole in a bracket 159 erected from the base 12 and which is threaded so it may be clamped to the bracket 159. The slotted hole in the bracket 159 allows the lever to be positioned with both of the conveyors pulled tight.

After the wiener has been scored by the scoring knives 6, rotated by the pads 8 and scored by the knives 9 it is carried on toward the suction rolls 10 and 11. Each of the suction rolls is a built up or laminated wheel formed of laminations 160 of steel and intermediate laminations 161 of plastic or some other material. The intermediate laminations are provided with grooves 162 extending radially from the central bore toward the periphery. The periphery of each of the suction rolls 10 or 11 is shaped to conform to a quadrant of a wiener lying between planes parallel and perpendicular to the axis of the suction roll. The rolls 10 or 11 are carried on bushings 163 pressed into the upper ends of hollow columns 164 extending upwardly from within the base 12 to points substantially on the same level as the end of the conveyor 5. The hollow columns 164 are provided with arms 165 by which they are mounted on sleeves 166 secured in the base 12 parallel to its longitudinal axis. The columns 164 are thus capable of oscillation about the sleeves 166 so as to change the spacing between the suction rolls 10 and 11 carried on their upper ends. Inasmuch as the weight of the columns 164 is offset from and above the supporting axis it is necessary to provide a spring 167, links 168 and a reversing lever 169 to maintain them in position with respect to the conveyors. The rolls 10 and 11 are driven from a shaft 170 journaled in the sleeves 166 through spiral gears 171 and 172. The gears 172 are mounted on short or stub shafts 173 which are journaled in bushings 174 secured in the bottom end of the hollow columns 164. The upper ends of the shafts 173 are formed with a square socket to receive a square shaft 175 whose upper end engages a mating socket 176 in the suction rolls 10 and 11. To facilitate assembly after the suction rolls have been removed for cleaning or other reasons the square shaft 175 is provided with a washer 177 which, while not normally contacting the inside of the bushing 163, serves to hold the shaft approximately central so that it may be easily engaged in the mating socket 176.

The shaft 170 is operatively connected through a pair of beveled gears 178 to a short transverse shaft 179 which is driven from the shaft 17 by means of a roller chain 180 running over sprocket wheels 181 and 182 pinned on the shafts 179 and 17 respectively. The velocity ratio of the drive is such that the periphery of the suction rolls 10 and 11 have a velocity equal to or slightly greater than that of the conveyor 5.

Suction is applied to the interior of the hollow columns 164 by connecting suitable suction lines into side openings 183 of the hollow columns 164. Each of the bushings 163 is provided with a port 184 on the side of the bushing facing the conveyor so that the radial grooves 162 are open to the suction line while their outer ends are in contact with the casing of a wiener. The suction is sufficient to cause the cellophane casing to adhere to the periphery of the rolls 10 and 11 and to be stripped from the wiener. As the suction rolls continue to turn the radial grooves 162 are cut off from the suction port 184 and since their outer ends are now covered with cellophane the vacuum will be maintained within them. About a third of a revolution later the grooves 162 are opened to a port or channel 185 cut in the outer surface of the bushing 163 and which through a narrow groove 186 and a drilled hole 187 is open to the atmosphere. The vacuum being thus relieved, the cellophane falls free from the periphery of the roll 10 or is scraped off by scrapers 188 carried on the ends of arms 189 extending outwardly from the hollow columns 164.

It will be noticed that rather than combining corresponding suction rolls 10 and 11 so that the periphery of each would conform to half the periphery of a wiener they have been divided into separate structures. By arranging them in this manner, when there is no wiener between them they can swing toward each other, being urged in that direction by the spring 167, until their smaller peripheries are practically in contact. This is done so that, as a scored wiener approaches, the suction rolls can act on the curved leading end to grasp the end of the cellophane and strip it from the curved end. Then as the wiener enters between the rolls they move back to the position shown in Figure XXIII and operate on the sides of the wiener. If the rolls 10 and 11 are combined into one set their larger peripheries instead of overlapping interfere and prevent them from swinging toward each other and operating on the leading ends of the wieners. If desired, the maximum inward travel of the rolls may be limited by set screws 190 which are set into bosses 191 of the hollow columns 164 in position to contact each other just before the corresponding suction rolls contact each other.

It may be necessary under certain conditions to apply a moderate amount of air pressure to the opening 187 so that the air pressure acting through the grooves 162 will blow the cellophane free from the rolls before it reaches the scrapers 188.

The electrical circuits for operating the device are shown in the schematic wiring diagram in Figure XXIV. Electrical power for operating the various solenoids is fed in through a power line 192 and a disconnect switch 193. From one side of the line 192 current can flow through a lead 194, the microswitch 144, a lead 195, the solenoid 131 and leads 196 and 197 to the other side of the line. This circuit actuates the turning pads to rotate the wieners about their longitudinal axis intermediate the two sets of scoring knives 6 and 9. It operates once each time the knives come together after the passage of a wiener. Current to operate the clutch which controls the operation of the incoming conveyor 2 is fed from one side of the line through the lead 194, a branch lead 198, normally closed contacts 199 of a relay 200, a lead 201, the solenoid 73 and a lead 202 which is connected to the lead 196 and the other side of the line. In this circuit as long as the relay 200 is not energized and power is supplied to the device through the switch 193, the solenoid 73 is energized to hold the clutch in driving position. The lead 194 is also connected to the microswitch 37 which is controlled by the fork 3 riding on the wieners. When the fork 3 drops it closes the microswitch 37, allows current to flow through it into a lead 203 connected to the center pole of the microswitch 56, and through its normally closed contact 204 and a lead 205 to the solenoid 38 and a lead 206 to the other side of the line. Thus in this circuit as soon as the fork 3 drops between two of the wieners the microswitch 37 is closed and current flows to energize the solenoid 38 which acts on the fork lever 40 to lock the fork 3 in its bottom position. The relay 200 is connected in parallel with the solenoid 38 so that it, at the same time, breaks the circuit to the clutch solenoid 73 and thus stops the conveyor 2. When the relay 200 is energized following the dropping of the fork 3 it closes its contacts 207 to allow current to flow to the knife solenoid 43 which causes the knife to drop and cut the wiener. When the knife reaches the bottom of its travel the finger 54 actuates the microswitch 56 thereby breaking the contact 204 and closing its normally open contact 208. Current then flows from the microswitch 56 through a lead 209 to the solenoid 57 which actuates the forked lever 40 to restore the fork 3 to its upper position and incidentally open the microswitch 37. The operation of the microswitch 56, occasioned by the drop of the knife, releases the solenoid 38 and the relay 200 to allow the knife to return to its upper position and to allow the relay to re-establish current flow to the clutch solenoid 73 which in turn restarts the conveyor 2.

The structure described provides means for separating a chain of wieners by cutting each one from the succeeding ones, of producing potential tearing lines in the cellophane casings and of subsequently applying suction to the cellophane to tear it along the scored lines and to strip it from the wieners.

It is of course possible to rearrange the structure in various ways and still secure the same result. For example, it would be entirely feasible to place the axes of the knives 9 at right angles to the axes of the knives 6 and thereby eliminate the necessity of providing the turning pads 8 and their associated mechanism.

Also while the structure has been shown for producing four scored lines along the sides of the wiener it is not so limited because by suitable modification the number of lines may be increased or decreased.

Other modifications of the mechanism are also possible without departing from the basic stripping method of producing potential scoring lines and removing the casing with externally applied vacuum.

Having described the invention, I claim:

1. The method of removing a casing membrane from wieners, frankfurters and like products, comprising the steps of scoring the membrane while on the product to weaken the membrane and subsequently applying suction to successive portions of the weakened membrane to strip it from the product.

2. The method of removing casing membranes from wieners, frankfurters and like products, comprising the steps of separating each wiener from a chain of wieners by transverse cuts which expose the ends thereof, scoring the membrane to form potential tearing lines, and subsequently applying suction to successive portions of the membrane to tear it along the potential tearing lines and strip it from the product.

3. A device for removing the encasing membrane of wieners, frankfurters, or the like, comprising means for feeding the wieners to a cut-off knife, means for operating the knife causing it to sever each wiener from the adjacent one, a plurality of knives for scoring the membrane along the sides of the wiener to produce potential tearing lines, and a plurality of suction rolls adapted to apply a suction pull to the membrane to tear the membrane along the potential tearing lines and to strip the membrane from the wiener.

4. In a device for removing the encasing membrane of a wiener or a similar product, in combination, means for scoring the membrane, and means for applying suction to the membrane between the scored lines to strip it from the wiener.

5. In a device for removing the encasing membrane of a wiener or a similar product, in combination, means for scoring the membrane, and means for applying suction to the membrane adjacent the scored lines to strip it from the wiener.

6. In a device for removing the skin of a wiener, frankfurter, sausage or similar product, in combination, a conveyor for drawing a chain of wieners into the device, a catch for interrupting the feeding of the conveyor with a wiener in position to be severed from the chain, a rotary cutoff knife for severing the wiener by means of a cut grazing the end of the following wiener, a plurality of rotary knives for scoring the skin of the wiener, means intermediate said knives for rotating the wiener about its longitudinal axis thereby spacing the scoring cuts about its periphery, and a plurality of perforated rollers for applying suction to the skin of the wiener to tear the skin along the scored cuts and for stripping the skin from the wiener.

7. In a device for removing the skin of wieners, frankfurters, or similar products, in combination, a knife for severing the wiener from a chain of wieners, said knife being adapted to graze the end of the following wiener to expose the end thereof, a plurality of knives for scoring the exterior surface of the skin to produce potential tearing lines, and means employing subatmospheric pressure for stripping the skin from the wieners.

8. In a device for removing the skin of wieners, frankfurters, or similar articles, in combination, a rotary knife mounted for reciprocation along a path transverse to the path of the article to be skinned, a plurality of rotary knives adapted to score the skin of the product to produce potential tearing lines, and a plurality of rolls adapted to apply suction to the skin to tear it along the scored lines and strip it from the article.

9. In a device for removing the skins of wieners, frankfurters and similar articles, in combination, a conveyor for feeding a chain of such connected articles into the device, means for stopping the conveyor as each article of the chain arrives at a fixed point, a rotary cutoff knife for separating each article in turn from the remainder of the chain, a second conveyor for advancing the severed articles, a plurality of guards mounted adjacent said second conveyor, a plurality of knives protruding through said guards, said guards and said knives being resiliently mounted to guide the articles therebetween and to score the skins of the articles to produce potential tearing lines, and means for applying suction to said skins to tear them along the scored lines and to strip them from the article.

10. In a device for removing the skins of wieners, frankfurters or similar articles, in combination, a conveyor for feeding a chain of wieners or similar articles into the device, means for severing each wiener from the chain, a plurality of guards defining narrow slits disposed along the path of the severed wieners, a plurality of rotary knives adapted to protrude slightly from the slits in said guards so as to score the skin of a wiener passing between said guards, and means for tearing the skin along the scored lines and stripping it from the wiener.

11. In a device for removing the skins of wieners, frankfurters or similar articles, in combination, means for separating the individual articles of a chain of such articles, means for scoring the skin of the article substantially parallel to its longitudinal axis, and a plurality of rollers connected to a source of vacuum adapted to engage the article and by applying suction thereto to remove the skin thereof.

12. In a device for removing the skins of wieners, frankfurters or similar articles, in combination, means for separating the individual articles of a chain of such articles, means for scoring the skin of the article substantially parallel to its longitudinal axis, and a plurality of rolls connected to a source of vacuum each adapted to engage a portion of the periphery of the article that lies between the scores in the skin of the article.

13. In a device for removing the skin from a wiener or similar product by scoring the skin and drawing it off by applying suction thereto, a scoring knife and guard assembly, said knife comprising a circular disk or substantial thickness having a beveled periphery, said guard comprising an upper and lower member each fitted with bearing surfaces one of which contacts said beveled periphery, resilient means urging said knife into eccentric relation with respect to said guard, and means for adjusting the spacing between said guard members to vary the contact between the beveled knife edge and the cooperating bearing surface to control the eccentricity of said knife in said guard.

14. In a device for removing the skin from a wiener or similar product by scoring the skin and drawing it off by applying suction thereto, a circular knife and guard assembly for scoring the skin, said guard comprising substantially cylindrical upper and lower housings that are held in spaced aligned position with a slot therebetween, said knife being positioned between and eccentric to said housings such that a portion of said knife protrudes through the slot, and means for adjusting the eccentricity of said knife with respect to said housings to control the depth of cut into an article held against the cylindrical surface of the guards.

15. In a device for removing the skin from a wiener or similar product by scoring the skin and subsequently applying suction thereto, a suction roll having radial passages therein that open into a wiener-contacting surface that conforms to the adjacent portion of a wiener, a resiliently mounted hollow axle for said roll, means for reducing the air pressure in said axle, a port for connecting said radial passages to the interior of said axle, and means for feeding scored wieners to said roll.

ROY H. DEITRICKSON.

REFERENCES CITED

The following references are of record in the file of this patent:

UNITED STATES PATENTS

| Number | Name | Date |
|---|---|---|
| 817,271 | Perks | Apr. 10, 1906 |
| 1,506,510 | Thuau | Aug. 26, 1924 |
| 2,096,221 | Atkinson | Oct. 19, 1937 |
| 2,340,755 | Jacobson | Feb. 1, 1944 |
| 2,369,360 | Martin | Feb. 13, 1945 |